United States Patent
Kinch et al.

(10) Patent No.: US 10,337,573 B2
(45) Date of Patent: Jul. 2, 2019

(54) TWO-PHASE TRANSMISSION CLUTCH STAGING

(71) Applicant: Ford Global Technologies, LLC, Dearborn, MI (US)

(72) Inventors: Derek Kinch, Ypsilanti, MI (US); Ravindra Velamakanni, Saline, MI (US); Cory Benson LaRoche, Wixom, MI (US); John Randall Armstead, Farmington Hills, MI (US); Joseph Scott Slayton, Macomb Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 292 days.

(21) Appl. No.: 15/337,666

(22) Filed: Oct. 28, 2016

(65) Prior Publication Data

US 2018/0119757 A1    May 3, 2018

(51) Int. Cl.

| | |
|---|---|
| *F16H 61/06* | (2006.01) |
| *F16D 48/06* | (2006.01) |
| *F16D 25/12* | (2006.01) |
| *F16H 63/46* | (2006.01) |
| *F16H 59/72* | (2006.01) |
| *F16H 61/02* | (2006.01) |

(52) U.S. Cl.
CPC .......... *F16D 48/066* (2013.01); *F16D 25/12* (2013.01); *F16H 61/061* (2013.01); *F16H 63/46* (2013.01); *F16D 2500/1026* (2013.01); *F16D 2500/30404* (2013.01); *F16H 59/72* (2013.01); *F16H 2061/0209* (2013.01); *F16H 2061/062* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| | | | |
|---|---|---|---|
| 4,757,886 A | 7/1988 | Brown et al. | |
| 7,731,630 B2* | 6/2010 | League | F16H 61/061 477/155 |
| 2009/0281699 A1* | 11/2009 | Mayumi | F16H 61/08 701/66 |
| 2012/0138413 A1* | 6/2012 | Moorman | F16H 61/2807 192/85.62 |
| 2013/0019479 A1* | 1/2013 | Habel | B23C 3/05 29/890.132 |

(Continued)

*Primary Examiner* — Justin Holmes
(74) *Attorney, Agent, or Firm* — David Kelley; Brooks Kushman P.C.

(57) ABSTRACT

In order to pre-stage a clutch piston in preparation for clutch engagement, a controller commands a high current to a Casting Integrated Direct Acting Solenoid (CIDAS) valve. This staging is performed in two distinct phases wherein the current is higher in the first phase than in the second phase. Staging the piston in this manner reduces the staging time and reduces the variability of the staging time. The duration of the first phase may be adjusted based on a number of parameters including, the length of a preceding engine off period, the number of clutch applications since the engine off period, a fluid temperature, and a length of time since a preceding engagement of the clutch.

15 Claims, 5 Drawing Sheets

(56) References Cited

U.S. PATENT DOCUMENTS

| | | | |
|---|---|---|---|
| 2013/0026401 A1* | 1/2013 | Burkhart | F16H 61/0251 251/129.15 |
| 2015/0018171 A1 | 1/2015 | Kawai et al. | |
| 2016/0116077 A1* | 4/2016 | Castora | F16K 31/061 700/282 |
| 2016/0356341 A1* | 12/2016 | Flemming | F16D 28/00 |

* cited by examiner

TWO-PHASE TRANSMISSION CLUTCH STAGING

TECHNICAL FIELD

This disclosure relates to the field of control systems for automatic transmissions for motor vehicles. More particularly, this disclosure relates to a method of commanding an electric current to stage a hydraulic clutch piston in preparation for clutch actuation.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Discrete ratio transmissions are capable of transmitting power via various power flow paths, each associated with a different speed ratio. A particular power flow path is established by engaging particular shift elements, such as clutches or brakes. Shifting from one gear ratio to another involves changing which shift elements are engaged. In many transmissions, the torque capacity of each shift element is controlled by routing fluid to the shift elements at controlled pressure. A controller adjusts the pressure by sending electrical signals to a valve body.

SUMMARY OF THE DISCLOSURE

A transmission includes a shift element such as a clutch or brake, a valve, and a controller. The shift element has a hydraulically actuated piston. The valve is configured to regulate a pressure of fluid supplied to the shift element in response to an electric current from the controller. The valve may be a Casting Integrated Direct Acting Solenoid (CI-DAS) valve. The controller is configured to adjust the electric current. The controller is programmed to stage the piston by setting the electric current to a high value throughout a first phase and setting the current to a lower value throughout a second phase. The controller may adjust the duration of first phase based on a number of criteria, including: the length of a preceding engine off period, the number of clutch applications since the engine off period, a fluid temperature, and a length of time since a preceding engagement of the clutch.

A method of staging a clutch piston includes setting a current to a solenoid valve at a first value for a first pre-defined duration and then setting the current to a second lower value for a second pre-defined duration. This is performed in response to a request to engage a shift element. The current may be reduced at a conclusion of the second duration. The first duration may be adjusted based on a number of criteria, including: the length of a preceding engine off period, the number of clutch applications since the engine off period, a fluid temperature, and a length of time since a preceding engagement of the clutch.

A controller includes a driver circuit and control logic. The driver circuit is configured to set an electric current to a valve. The control logic is configured to stage a piston clutch by commanding the electric current to a high value throughout a first phase and then commanding the current to a lower value throughout a second phase. The controller may reduce the current at the conclusion of the second phase. The controller may adjust the duration of first phase based on a number of criteria, including: the length of a preceding engine off period, the number of clutch applications since the engine off period, a fluid temperature, and a length of time since a preceding engagement of the clutch.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
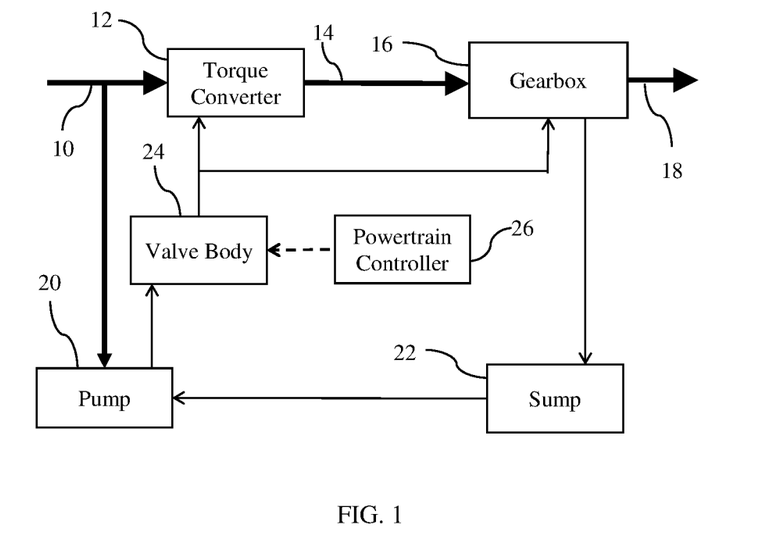
FIG. 1 is a schematic diagram of a transmission system.

FIG. 1 schematically illustrates a vehicle transmission. Bold solid lines represent mechanical power flow connections. Thin solid lines represent the flow of hydraulic fluid. Dashed lined represent the flow of information signals. Power is supplied at input shaft 10, generally from an internal combustion engine crankshaft. Fluid coupling 12 includes an impeller driveably connected to input shaft 10 and a turbine driveably connected to turbine shaft 14. Power is transmitted from the impeller to the turbine via moving fluid whenever the impeller rotates faster than the turbine. Fluid coupling 12 may be a torque converter which also includes a stator which redirects the fluid when the impeller is rotating substantially faster than the impeller such that the turbine torque is a multiple of the impeller torque. Gearbox 16 includes gearing and shift elements configured to establish various power flow paths between turbine shaft 14 and output shaft 18. Each power flow path may be established by engaging an associated subset of the shift elements. At low vehicle speed, a power flow path providing torque multiplication and speed reduction between the turbine shaft and the output shaft may be established to optimize vehicle performance. At higher vehicle speeds, a power flow path providing speed multiplication may be established to minimize fuel consumption.

The shift elements within gearbox 16 are engaged by supplying hydraulic fluid at an elevated pressure to a clutch apply chamber. Each shift element may include a clutch pack having friction plates splined to one component interleaved with separator plates splined to a different component. The fluid forces a piston to squeeze the clutch pack such that frictional force between the friction plates and the separator plates couples the components. The torque capacity of each shift element varies in proportion to changes in the fluid pressure. Pump 20, driven by input shaft 10, draws fluid from sump 22 and delivers it at an elevated pressure to valve body 24. Valve body 24 delivers the fluid to the clutch apply chambers at a pressure controlled in accordance with signals from powertrain controller 26. In addition to the fluid provided to clutch apply chambers, valve body provides fluid for lubrication and provides fluid to torque converter 12. The fluid eventually drains from gearbox 18 back to sump 22 at ambient pressure.

Figure 2:
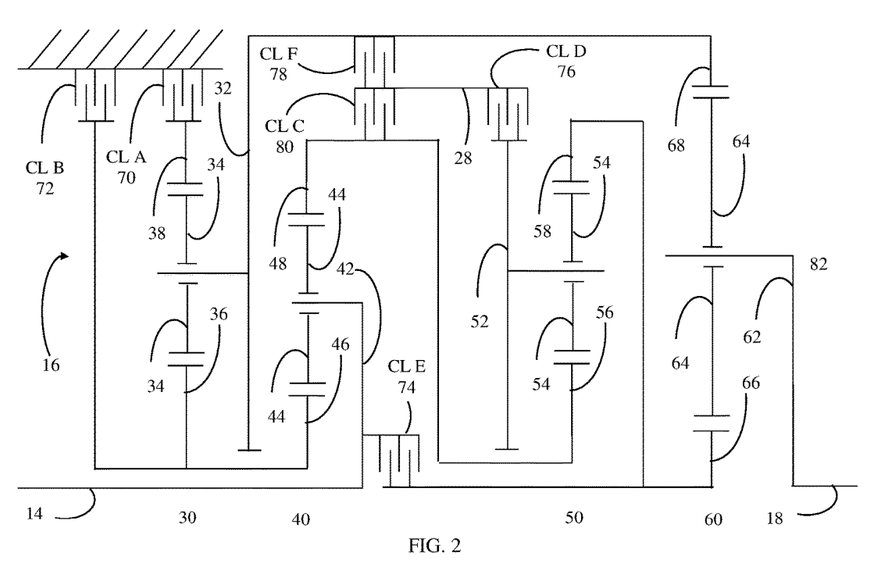
FIG. 2 is a schematic diagram of a transmission gearing arrangement suitable for the gearbox of the transmission system of FIG. 1.

An example gearbox 16 is schematically illustrated in FIG. 2. The transmission utilizes four simple planetary gear sets 30, 40, 50, and 60. Sun gear 36 is fixedly coupled to sun gear 46, carrier 32 is fixedly couple to ring gear 68, ring gear 48 is fixedly coupled to sun gear 56, ring gear 58 is fixedly coupled to sun gear 66, turbine shaft 14 is fixedly coupled to carrier 42, and output shaft 18 is fixedly coupled to carrier 62. Ring gear 38 is selectively held against rotation by brake 70 and sun gears 36 and 46 are selectively held against rotation by brake 72. Turbine shaft 14 is selectively coupled to ring gear 58 and sun gear 66 by clutch 74. Intermediate shaft 28 is selectively coupled to carrier 52 by clutch 76, selectively coupled to carrier 32 and ring gear 68 by clutch 78, and selectively coupled to ring gear 48 and sun gear 56 by clutch 80. A suggested ratio of gear teeth for each planetary gear set is listed in Table 1.

TABLE 1

| Ring 38/Sun 36 | 2.20 |
| Ring 48/Sun 46 | 1.75 |
| Ring 58/Sun 56 | 1.60 |
| Ring 68/Sun 66 | 3.70 |

As shown in Table 2, engaging the clutches and brakes in combinations of four establishes ten forward speed ratios and one reverse speed ratio between turbine shaft 14 and output shaft 18. An X indicates that the clutch is required to establish the speed ratio. An (X) indicates the clutch can be applied but is not required to establish the power flow path. In $1^{st}$ gear, either clutch 78 or clutch 80 can be applied instead of applying clutch 76 without changing the speed ratio. When the gear sets have tooth numbers as indicated in Table 1, the speed ratios have the values indicated in Table 2.

TABLE 2

| | A 70 | B 72 | C 80 | D 76 | E 74 | F 78 | Ratio | Step |
|---|---|---|---|---|---|---|---|---|
| Rev | X | X | | X | | X | -4.79 | 102% |
| Park | X | X | X | | | | | |
| $1^{st}$ | X | X | | (X) | X | | 4.70 | |
| $2^{nd}$ | X | X | X | X | | | 2.99 | 1.57 |
| $3^{rd}$ | X | | X | X | X | | 2.18 | 1.37 |
| $4^{th}$ | X | | X | X | | X | 1.80 | 1.21 |
| $5^{th}$ | X | | X | | X | X | 1.54 | 1.17 |
| $6^{th}$ | X | | | X | X | X | 1.29 | 1.19 |
| $7^{th}$ | | | X | X | X | X | 1.00 | 1.29 |
| $8^{th}$ | | X | | X | X | X | 0.85 | 1.17 |
| $9^{th}$ | | X | X | | X | X | 0.69 | 1.24 |
| $10^{th}$ | | X | X | X | | X | 0.64 | 1.08 |

Figure 3:
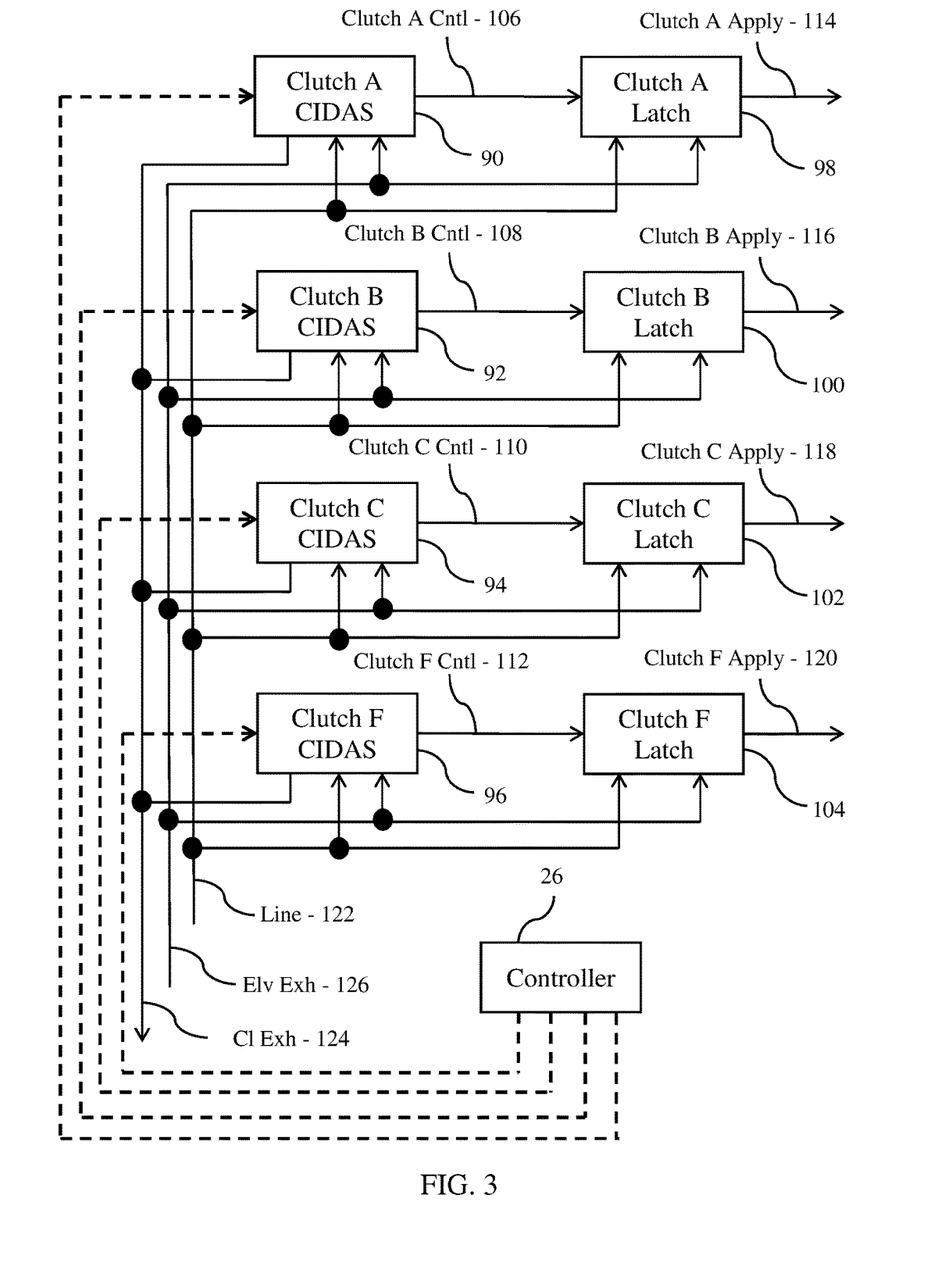
FIG. 3 is a schematic diagram of a portion of a clutch control subsystem of the hydraulic control system for use to control four of the shift elements of the gearing arrangement of FIG. 2.

FIG. 3 schematically illustrates part of the clutch control subsystem of valve body 24. Controller 26 adjusts the torque capacity of each clutch by adjusting an electrical current to a corresponding solenoid. The controller includes separate driver circuits to set each electrical current based on a value calculated by the control logic. For example, the driver circuit may set the current by varying a duty cycle of a pulse width modulation circuit based on closed loop feedback from a current sensor. During a shift, accurate control of the torque capacity of the on-coming and off-going clutches is very important. The relationship between changes in the electrical current and changes in torque capacity is called the gain. If the gain is too high, then accuracy of torque capacity control suffers. The torque capacity of engaged clutches while in a fixed gear or holding clutches during a shift must be maintained higher than the transmitted torque in order to avoid clutch slip. Sometimes, these requirements are in tension with one another. For example, in reverse, the torque capacity of brake A must be maintained at more than three and a half times the gearbox input torque. In $6^{th}$ gear, on the other hand, the torque transmitted by brake A is less than 30% of the gearbox input torque. Brake A is the off-going element in a shift from $6^{th}$ gear to $7^{th}$ gear. During this shift, which may occur at relatively low gearbox input torque, a low gain is required. However, this same low gain would not be suitable in reverse gear at relatively high gearbox input torque.

FIG. 3 illustrates the components that control four of the six shift elements of the gearing arrangement of FIG. 2, CL A 70, CL B 72, CL C 80, and CL F 78. Each clutch apply circuit is controlled by the combination of a Casting-Integrated Direct-Acting Solenoid (CIDAS) 90, 92, 94, or 96 and a corresponding latch valve 98, 100, 102, or 104. Each CIDAS controls the pressure in a corresponding controlled pressure circuit 106, 108, 110, or 112 in response to a control signal from controller 26. Each latch valve connects a clutch apply circuit 114, 116, 118, or 120 to a corresponding controlled pressure circuit when the pressure in the controlled pressure circuit is below a threshold and connects the clutch apply circuit to line pressure circuit 122 when the controlled pressure is above the threshold. This arrangement enables use of a low gain during shift events and yet provides high torque capacity at other times. The thresholds and gains may vary among the various clutches. When a controlled pressure is commanded to zero, the CIDAS valve connects the controlled pressure circuit to clutch exhaust circuit 124 which provides a path for fluid to escape from the clutch apply chamber to de-stroke the clutch piston. Elevated exhaust circuit 126 provides a supply of fluid at very near ambient pressure. The structure and operation of a CIDAS/latch valve combination is described in detail in U.S. Patent Application Publication 2013/0026401 which is incorporated by reference in its entirety herein.

When a brake or clutch is completely disengaged, a return spring pushes the clutch piston away from the clutch pack to minimize parasitic drag. To re-engage the clutch, the apply piston must be re-filled with fluid to move the piston back against the clutch pack. This is called stroking the piston. Until the piston is stroked, the torque capacity remains negligible and is not responsive to changes in the commanded pressure. In preparation for re-engagement, the controller may command a moderately high current to the CIDAS valve for a period of time calculated to move the piston most of the way to the stroked position. This is called the boost phase of the re-engagement. If the boost phase continues after the piston is stroked, the torque capacity of the clutch will spike above the desired level resulting in poor shift quality. If the boost phase does not succeed in moving the piston close enough to the stroked position, then there will be an excessive delay between a subsequent pressure command and the resulting increase in torque capacity while the piston moves the rest of the way. That also results in poor shift quality.

Figure 4:
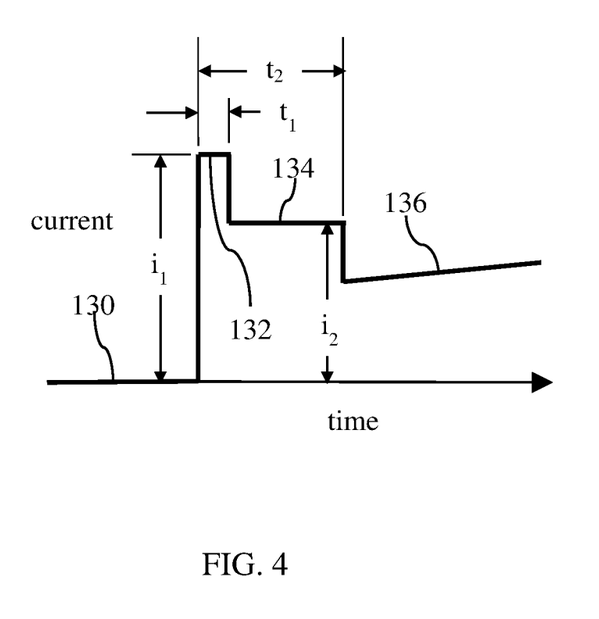
FIG. 4 is a graph of current over time during staging of a clutch piston in preparation for engagement of one of the clutches of FIG. 2.

A number of factors cause variation in the response of the system during the boost phase. For example, in some conditions, friction in the CIDAS valve may cause the valve to stick momentarily, delaying the flow of fluid and movement of the piston. The inventors have determined that these delays are related the fluid temperature and the elapsed time since the clutch was last applied. The inventors have experimentally determined that consistency is increased by stroking the piston in two boost phases as shown in FIG. 4. At 130, the clutch is in its initial disengaged state and the commanded current is zero. Upon determining that the clutch must be prepared for engagement, a first boost phase is performed at 132 by commanding a current of $i_1$ for a duration of $t_1$. Although current level $i_1$ is a calibratable value, the inventors have determined that maximum current is appropriate. After the first boost phase 132, the commanded current is reduced to a lower level $i_2$ for a second boost phase 134. The total duration of both boost phases is $t_2$. At 136, the current is set based on a desired torque capacity and a transfer function. For an oncoming clutch in a shift, the desired torque capacity, and therefore the commanded current, gradually increase.

Figure 5:
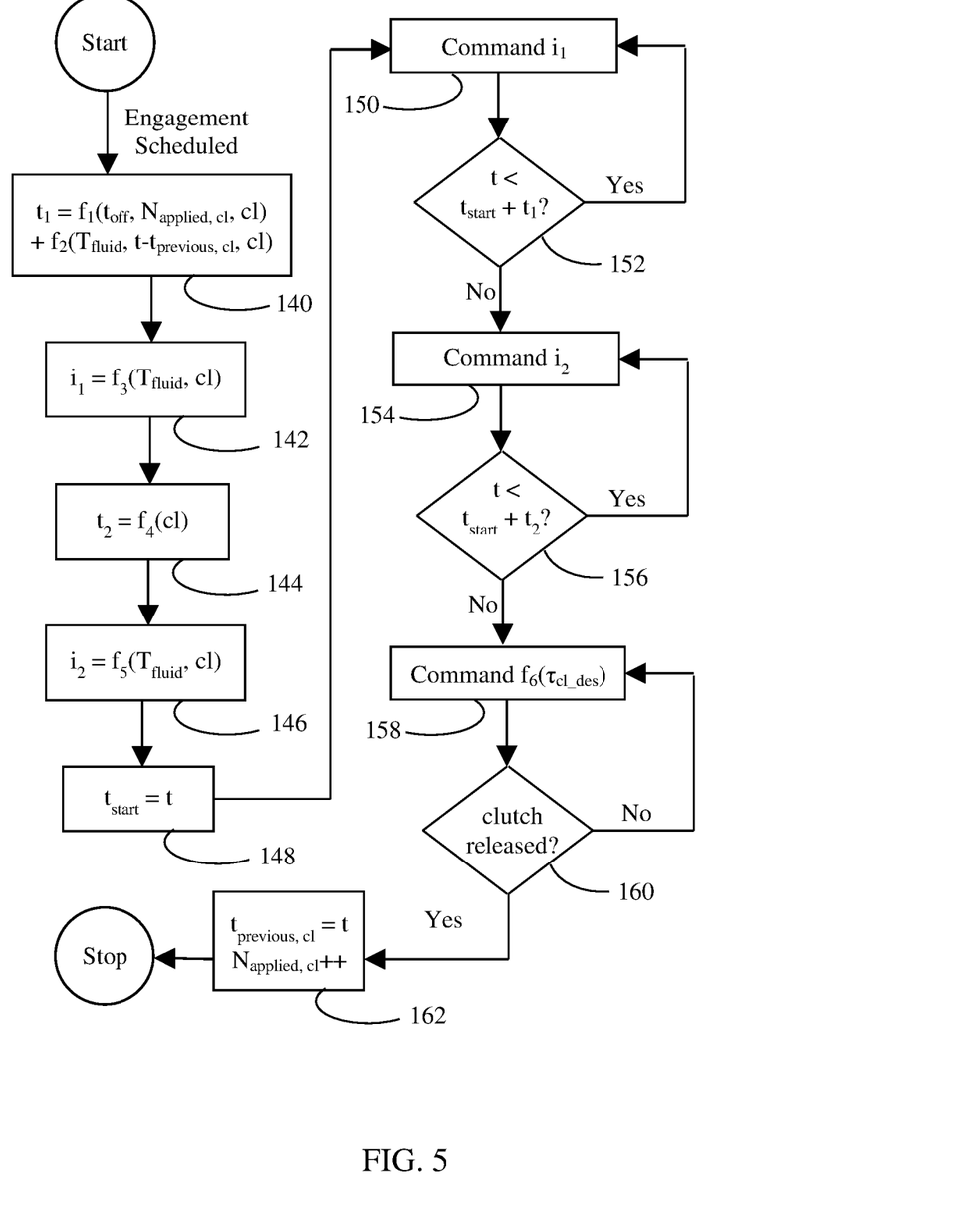
FIG. 5 is a flow chart illustrating a process of controlling the current to one of the solenoid valves of FIG. 3 in order to stage a clutch piston according to FIG. 4.

The method is further illustrated by the flowchart of FIG. 5. The process begins in response to an engagement being scheduled. At 140, the controller calculates the duration $t_1$ of the first boost phase. The inventors have determined experimentally that a sum of two functions, $f_1$ and $f_2$, is effective. The $f_1$ function considers the length of time, $t_{off}$, that the engine was off prior to the most recent time it was started. This value can be updated whenever the engine is started. The $f_1$ function also considers the number of times that the clutch has been applied since the engine has been turned on. This value is reset when the engine is started and incremented whenever the clutch is released. The function may be represented as a look-up table in memory. A different look-up table may be used for each different clutch. The $f_2$ function considers the temperature of the fluid and the length of time since the most recent time release of the clutch. This time of the most recent release, $t_{previous, cl}$, may be updated whenever the clutch is released. The variable t is the current time. Like $f_1$, the $f_2$ function may be represented as a look-up table in memory. A different look-up table may be used for each different clutch. At 142, the controller calculates the commanded current for the first boost phase. At 144 and 146, the controller calculates the total boost phase duration and the current for the second boost phase respectively.

At 148, the controller records the time of the beginning of the first boost phase. At 150, the controller executes the first boost phase by commanding the current level $i_1$ that was calculated at 142. The controller repeatedly checks at 152 whether it is time to end the first boost phase. When $t_1$ has elapsed, the controller executes the second boost phase by commanding the current level $i_2$ calculated at 146. The controller repeatedly checks at 156 whether it is time to end the second boost phase. After both boost phases, the controller commands a current level corresponding to a desired torque capacity at 158 until the clutch is released at 160. At 162, the controller updates some values for use in future engagements.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
   a shift element having a hydraulically actuated piston;
   a valve configured to regulate a pressure of fluid supplied to the shift element in response to an electric current; and
   a controller configured to adjust the current, the controller being programmed to
   stage the piston by setting the current to a high value throughout a first phase and setting the current to a lower value throughout a second phase, and
   adjust a duration of the first phase based on a number of times the shift element is applied since an engine start.

2. The transmission of claim 1 wherein the valve is a Casting Integrated Direct Acting Solenoid (CIDAS) valve.

3. The transmission of claim 1 wherein the controller is further programmed to adjust the duration of the first phase based on a length of time an engine is off preceding the engine start.

4. The transmission of claim 1 wherein the controller is further programmed to adjust the duration of the first phase based on a fluid temperature.

5. The transmission of claim 1 wherein the controller is further programmed to adjust the duration of the first phase based on a length of time since a preceding application of the shift element.

6. A method of staging a clutch piston comprising:
   in response to a request to engage a shift element, setting a current to a solenoid valve at a first value for a first defined duration;

then setting the current to a second value less than the first value for a second defined duration; and adjusting the first duration based on a fluid temperature.

7. The method of claim 6 further comprising reducing the current at a conclusion of the second duration.

8. The method of claim 6 further comprising adjusting the first duration based on a number of times the shift element is applied since an engine start.

9. The method of claim 8 further comprising adjusting the first duration based on a length of time an engine is off preceding the engine start.

10. The method of claim 6 further comprising adjusting the first duration based on a length of time since a preceding application of the shift element.

11. A controller comprising:

a driver configured to set an electric current to a valve; and control logic configured to stage a clutch piston by commanding the electric current to a high value throughout a first phase and then commanding the current to a lower value throughout a second phase, and adjust a duration of the first phase based on a length of time since a preceding application of the clutch.

12. The controller of claim 11 wherein the control logic is further configured to reduce the current at a conclusion of the second phase.

13. The controller of claim 12 wherein the control logic is further configured to adjust the duration of the first phase based on a number of times a shift element has been applied since an engine start.

14. The controller of claim 13 wherein the control logic is further configured to adjust the duration of the first phase based on a length of time an engine is off preceding the engine start.

15. The controller of claim 12 wherein the control logic is further configured to adjust the duration of the first phase based on a fluid temperature.

* * * * *